US006638982B2

(12) United States Patent
Brown

(10) Patent No.: US 6,638,982 B2
(45) Date of Patent: Oct. 28, 2003

(54) METHOD OF PREPARING A FUMED METAL OXIDE DISPERSION

(75) Inventor: Steven E. Brown, Tyngsboro, MA (US)

(73) Assignee: Cabot Corporation, Boston, MA (US)

( * ) Notice: Subject to any disclaimer, the term of this patent is extended or adjusted under 35 U.S.C. 154(b) by 4 days.

(21) Appl. No.: 09/992,730

(22) Filed: Nov. 14, 2001

(65) Prior Publication Data

US 2002/0086909 A1 Jul. 4, 2002

Related U.S. Application Data

(60) Provisional application No. 60/249,664, filed on Nov. 15, 2000.

(51) Int. Cl.[7] .......................... B01F 3/12; C01B 33/141
(52) U.S. Cl. ...................... 516/86; 106/287.34; 252/62; 423/336; 516/34
(58) Field of Search ................ 516/86, 34; 106/287.34; 252/62; 423/336

(56) References Cited

U.S. PATENT DOCUMENTS

| | | | |
|---|---|---|---|
| 2,984,629 A | | 5/1961 | Loftman et al. |
| 3,055,831 A | * | 9/1962 | Barnett et al. ................. 252/62 |
| 3,956,171 A | * | 5/1976 | Moore, Jr. et al. |
| 4,010,242 A | | 3/1977 | Iler et al. .................... 423/335 |
| 4,036,663 A | | 7/1977 | Williams et al. |
| 4,042,361 A | | 8/1977 | Bihuniak et al. ............... 65/18 |
| 4,225,464 A | * | 9/1980 | Scholten et al. ......... 423/336 X |
| 4,297,143 A | * | 10/1981 | Kleinschmit et al. ... 423/336 X |
| 4,427,811 A | | 1/1984 | Elias et al. .................... 524/96 |
| 4,588,421 A | | 5/1986 | Payne .......................... 51/308 |
| 5,221,497 A | * | 6/1993 | Watanabe et al. |
| 5,246,624 A | | 9/1993 | Miller et al. |
| 5,660,622 A | * | 8/1997 | Nikoloff ................ 106/287.34 |
| 5,967,964 A | * | 10/1999 | Hattori et al. ............ 516/86 X |
| 6,068,769 A | | 5/2000 | Iio et al. ..................... 210/315 |

* cited by examiner

Primary Examiner—Richard D. Lovering

(57) ABSTRACT

The invention provides a method of preparing a dispersion of a fumed metal oxide in a liquid carrier comprising the following sequential steps: (a) providing a liquid carrier at a pH that effects dissolution of the metal oxide at a rate the same as or greater than the metal oxide dissolution rate in water at a pH of about 8, (b) mixing with the liquid carrier, in any order, one or more aliquots of both a fumed metal oxide and a metal ion source to form a dispersion, such that the dispersion does not coagulate, and (c) optionally adjusting the pH of the dispersion to the pH of the liquid carrier in step (a). The method allows for the preparation of the dispersion to be done with a high solids loading and at a high pH. Furthermore, the dispersion can have a shelf-life of at least about 1 hour or more at 25° C.

42 Claims, 3 Drawing Sheets

METHOD OF PREPARING A FUMED METAL OXIDE DISPERSION

CROSS-REFERENCE TO RELATED PATENT APPLICATIONS

This patent application claims priority to provisional U.S. patent application No. 60/249,664, filed on Nov. 15, 2000.

FIELD OF THE INVENTION

This invention pertains to a method of preparing a fumed metal oxide dispersion that is useful in a variety of applications.

BACKGROUND OF THE INVENTION

There are many applications for fumed metal oxides, particularly for fumed silica, of extremely fine particle size in which it is convenient to apply the fumed silica in the form of a dispersion. Such applications include foamed rubber lattices, paper coatings (i.e., recording media), the manufacture of optical fibers and quartz glassware, thermal insulation, and chemical-mechanical polishing (CMP). There also are many occasions where it is convenient to densify fumed silica for storage or transport by combining the fumed silica with water to form an aqueous dispersion.

Fumed silica is generally produced by the vapor phase hydrolysis of chlorosilanes, such as silicon tetrachloride, in a hydrogen oxygen flame. The overall reaction is:

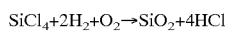

$$SiCl_4 + 2H_2 + O_2 \rightarrow SiO_2 + 4HCl$$

In this process, submicron sized molten spheres of silica are formed. These particles collide and fuse to form three dimensional, branched, chain-like aggregates, of approximately 0.1–0.5 μm in length. Cooling takes place very quickly, limiting the particle growth and insuring the fumed silica is amorphous. These aggregates in turn form agglomerates of 0.5–44 μm (about 325 US mesh). Fumed silicas generally have very high purity, with total impurities, in many cases below 100 ppm (parts per million). This high purity makes fumed silica dispersions particularly advantageous for many applications.

In order to be useful for the applications listed above and other potential applications, the fumed metal oxide dispersion cannot coagulate. The ability of the dispersion to resist gelling is generally referred to as the stability of the dispersion. In general, the more stable the dispersion, the slower the dispersion will coagulate. Dispersions tend to coagulate when the solid loading is too high or when the dispersion reaches a certain pH level. Therefore, it would be desirable to produce a dispersion that could be prepared with both a high solids loading and at a high pH while still remaining stable for an extended period of time.

Attempts to make stable dispersions have involved a number of different methods. U.S. Pat. No. 5,246,624 discloses a method of preparing an aqueous colloidal dispersion comprising fumed silica, an acid, and a stabilizer. Similarly, U.S. Pat. No. 2,984,629 discloses a method of preparing aqueous dispersions of metal oxides comprising mixing the metal oxide with water and subjecting this mixture to high shear in the presence of a sufficient amount of an alkali hydroxide and a dispersing agent.

While these methods are known, there still remains a need for improved methods of preparing stable dispersions of fumed metal oxides, particularly with high solids loadings and at relatively high pH. The invention provides such an improved method. These and other advantages of the present invention, as well as additional inventive features, will be apparent from the description of the invention provided herein.

BRIEF SUMMARY OF THE INVENTION

The invention provides a method of preparing a fumed metal oxide dispersion. The method comprises providing a liquid carrier at a pH that effects dissolution of the metal oxide at a rate the same as or greater than the metal oxide dissolution rate in water at a pH of about 8. One or more aliquots of both a fumed metal oxide and a metal ion source then are mixed with the liquid carrier, in any order, to form a dispersion, such that the dispersion does not coagulate. The pH of the dispersion can be optionally adjusted to the initial pH of the liquid carrier.

DETAILED DESCRIPTION OF THE INVENTION

Figure 1:
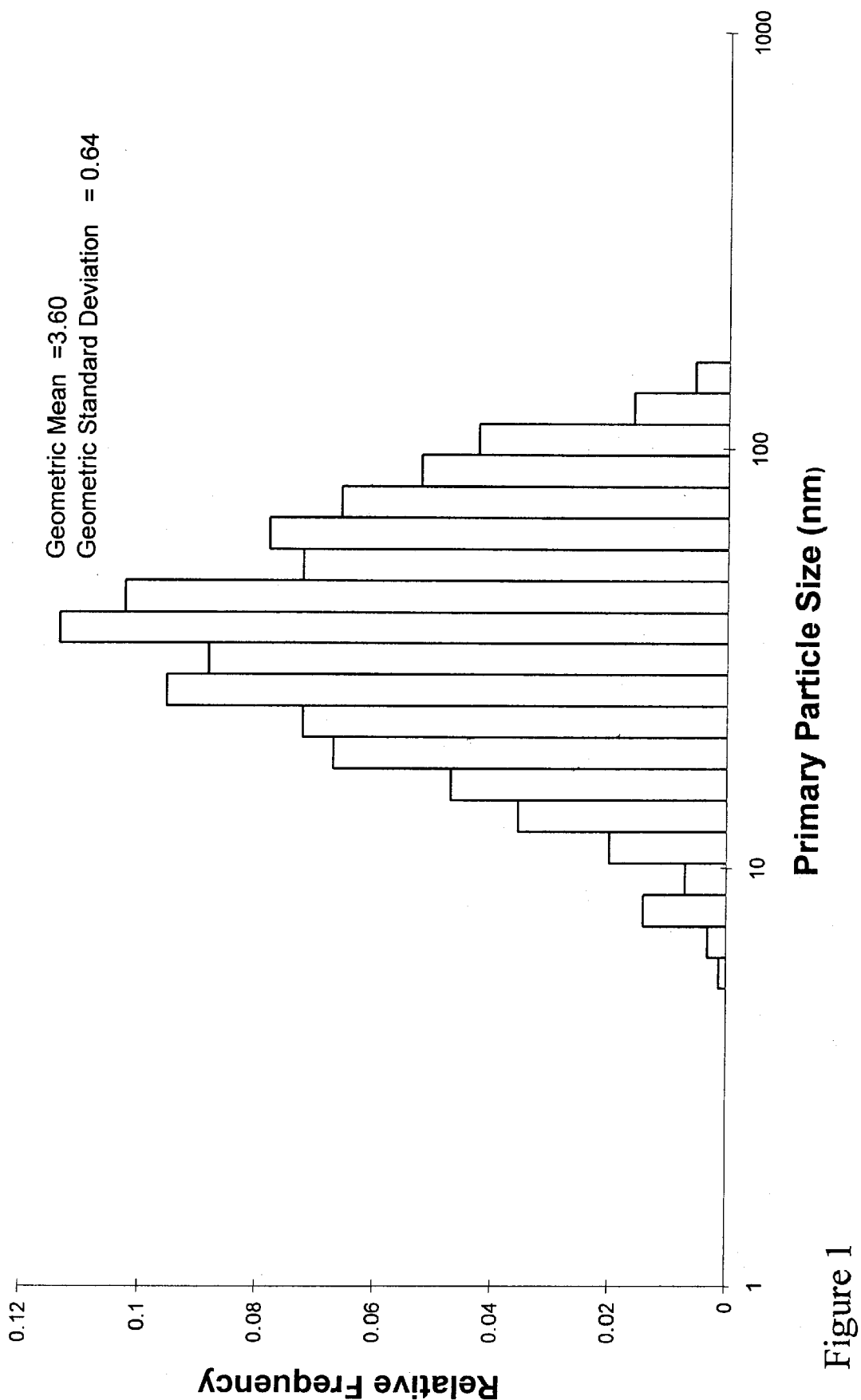
FIG. 1 is a graph depicting the primary particle size of a fumed silica (in log scale) versus the relative frequency of that primary particle size for the fumed silica, demonstrating a relatively broad primary particle size distribution for the fumed silica.

The invention provides a method of preparing a dispersion of a fumed metal oxide in a liquid carrier comprising the following sequential steps: (a) providing a liquid carrier at a pH that effects dissolution of the metal oxide at a rate the same as or greater than the metal oxide dissolution rate in water at a pH of about 8, (b) mixing with the liquid carrier, in any order, one or more aliquots of both a fumed metal oxide and a metal ion source to form a dispersion, such that the dispersion does not coagulate, and (c) optionally adjusting the pH of the dispersion to the pH of the liquid carrier in step (a).

The liquid carrier can be any suitable liquid carrier. Suitable liquid carriers include, for example, water, aqueous systems (e.g., water in combination with other components such as other solvents), condensed gas (e.g., super-critical $CO_2$), alcohols, ammonia, and the like. Desirably, the liquid carrier comprises water and a base.

The pH of the liquid carrier can vary from step to step of the inventive method. Initially (i.e., before the addition of the fumed metal oxide and metal ion source), the liquid carrier is provided at a pH that effects dissolution of the metal oxide at a rate the same as or greater than the metal oxide dissolution rate in water at a pH of about 8. Therefore, when the liquid carrier is primarily water, the liquid carrier initially will have a pH of about 8 or more, e.g., about 9.5–12 or preferably about 10–11.

When a base is present in the liquid carrier, any suitable base can be utilized. Suitable bases included, for example, alkalis (e.g., sodium hydroxide, potassium hydroxide, lithium hydroxide, and ammonium hydroxide, ammonia), amines (e.g., triethylamine and dimethylethanol amine), and quaternary ammonium salts (e.g., tetramethylammonium hydroxide). Preferably, the base is tetramethylammonium hydroxide (TMAOH).

The amount of base present in the liquid carrier can depend on the amount of fumed metal oxide and metal ion source mixed with the liquid carrier to form the dispersion. Generally the quantity of base present in the liquid carrier is an amount of about 0.0025–5 wt. %. For example, the base can be present in the liquid carrier in an amount of about 0.1 wt. % or more, about 0.5 wt. % or more, or even about 1 wt. % or more. To achieve the desirable pH levels, however, it may be necessary to mix a base with the liquid carrier in an amount of about 1.25 wt. % or more, about 1.5 wt. % or more, or even about 1.75 wt. % or more. If very high solids loading is achieved (i.e., a solids loading of about 60 wt. % or more), it may be necessary to mix a base with the liquid carrier in an amount of about 2 wt. % or more, about 2.5 wt. % or more, or even about 3 wt. % or more (e.g., about 4 wt. % or more, or even about 5 wt. % or more).

One or more aliquots of both a fumed metal oxide and a metal ion source are mixed with the liquid carrier, in any order, to form a dispersion such that the dispersion does not coagulate. The fumed metal oxide and metal ion source can be added to the liquid carrier while mixing the combination, or the fumed metal oxide and the metal ion source can be added to the liquid carrier and mixed thereafter. The two components also can be added incrementally, in a series of steps, with mixing taking place between each addition step. Furthermore, the two components can be individually or simultaneously mixed with the liquid carrier. When the two components are individually mixed with the liquid carrier, they are kept separate from each other (e.g., in different containers), and each is mixed individually (i.e., separately) with the liquid carrier. The two components also can be associated with each other before being mixed with the liquid carrier. For example, the metal ion source can be provided in a solution and sprayed over the fumed metal oxide, thereby becoming associated with the fumed metal oxide, before the two components are mixed with the liquid carrier.

Any suitable fumed metal oxide can be used in conjunction with the inventive method. Suitable fumed metal oxides include, for example, alumina, silica, titania, ceria, zirconia, and magnesia, as well as co-formed products thereof, mixtures thereof, and chemical admixtures thereof. Preferably, the fumed metal oxide is silica.

The ability to have a high solids loading is an advantageous feature of the inventive method. Generally, a high solids loading refers to a fumed metal oxide being added to the liquid carrier in an amount of about 40 wt. % or more. Preferably, the fumed metal oxide is added to the liquid carrier in an amount of about 45 wt. % or more, about 50 wt. % or more, or even about 55 wt. % or more. More preferably, the fumed metal oxide is added to the liquid carrier in an amount of about 60 wt. % or more (e.g., about 65 wt. % or more).

The fumed metal oxide can have any suitable surface area. To produce dispersions of fumed metal oxides having a fumed metal oxide concentration of about 40 wt. % or more, preferably a fumed metal oxide with a surface area of about 20–110 $m^2/g$ is utilized. More preferably, the fumed metal oxide has a surface area of about 25–75 $m^2/g$, and most preferably, the fumed metal oxide has a surface area of about 35–45 $m^2/g$. The surface area of the fumed metal oxide can be measured by any suitable method known in the art. Typically, the surface area of the fumed metal oxide is determined by the method of S. Brunauer, P. H. Emmet, and I. Teller, J. Am. Chemical Society, Volume 60, page 309 (1938), which is commonly referred to as the BET method.

Any suitable metal ion source can be used in conjunction with the inventive method. Suitable metal ion sources include acids, bases, salts, and the like. Preferably the metal ion source is a salt. Suitable salts include, for example, sulfates, nitrates, chlorides, acetates, and mixtures thereof. The metal ion of the metal ion source can be any suitable metal ion. Suitable metal ions include both monovalent and polyvalent metal ions represented in the periodic table by Group I, Group II, and Group III. Transition metal ions also are suitable for use in conjunction with the inventive method. Preferably, the metal ion is a Group III metal ion, and more preferably the metal ion is aluminum. It has been found that particularly advantageous results are obtained with a metal ion source comprising an aluminum salt. A preferred metal ion source is aluminum nitrate.

The metal ion can be present in the liquid carrier in any suitable amount. Generally, the metal ion source is mixed with the liquid carrier such that the metal ion is present in the liquid carrier in an amount of about 0.0001–1 wt. %. Preferably, the metal ion source is mixed with the liquid carrier such that the metal ion is present in the liquid carrier in an amount of about 0.001–0.75 wt. %, e.g., about 0.005–0.5 wt. %.

The desired amounts of fumed metal oxide and metal ion source mixed with the liquid carrier are related to the surface area of the fumed metal oxide, the pH of the liquid carrier, and the type and amount of components utilized in the liquid carrier. Therefore, the solids loading in each dispersion may vary according to the specific conditions of the components.

The mixing of the fumed metal oxide and the metal ion source with the liquid carrier, such that the dispersion does not coagulate, results in the formation of the fumed metal oxide dispersion. The dispersion can have any suitable pH. The dispersion, particularly when it is an aqueous dispersion, has a pH of desirably about 8 or more, preferably about 9 or more, more preferably about 10 or more, and most preferably about 11 or more (e.g., about 11–13).

Optionally, the pH of the dispersion is adjusted after formation of the fumed metal oxide dispersion. The pH adjustment can be effected in any suitable manner, e.g., by the addition of a base to the dispersion. The dispersion pH can be adjusted to any suitable pH, preferably to the initial pH of the liquid carrier, i.e., prior to the addition of the fumed metal oxide and metal ion source thereto. For example, the pH of the dispersion can be adjusted (generally raised) to about 8 or more, about 9 more, about 10 or more, or even about 11 or more.

The components utilized in the preparation of the dispersion preferably are mixed together using a high shear mixer. Mixing under high shear conditions provides an even distribution of the components of the dispersion, thereby forming a substantially uniform or homogeneous mixture of the components. Mixing under high shear conditions also can improve the rheology of the dispersion and can increase the strength and uniformity of any final article prepared from the dispersion. High shear mixers useful in the context of the inventive method are described in U.S. Pat. Nos. 4,225,247, 4,552,463, 4,889,428, 4,944,595, and 5,061,319.

Typically, mixing under high shear conditions involves a shear rate of about $10^2$ $sec^{-1}$ or more. Preferably, the shear rate is about $10^3$ $sec^{-1}$ or more, and more preferably, the shear rate is about $10^4$ $sec^{-1}$ or more.

In a preferred embodiment, the dispersion consists essentially of water, a base, fumed silica, and aluminum nitrate. The water and base are mixed to form the liquid carrier, wherein the liquid carrier has a pH of about 9–10, especially a pH of about 10. Fumed silica and aluminum nitrate then are sequentially mixed with the liquid carrier under high shear conditions in one or more aliquots to produce the dispersion, such that the dispersion does not coagulate. Additional base is added to the dispersion to achieve a fumed metal oxide dispersion with a pH of about 11–13, especially a pH of about 12.

An important feature of the inventive method is the stability of the resulting dispersion. A dispersion can be prepared in accordance with the inventive method having a relatively long shelf-life. With fumed metal oxide dispersions having high solids loadings, it can be difficult to keep the dispersion from coagulating. The inventive method provides a way to prepare fumed metal oxide dispersions having high solids loadings that have a significant shelf-life, i.e., fumed metal oxide dispersions that do not coagulate or settle for a significant period of time at standstill (i.e., when not being mixed or otherwise exposed to shear). For example, dispersions made using the inventive method can have a shelf-life of about 1 hour or more at 25° C. Preferably, the dispersion has a shelf-life of about 12 hours or more at 25° C., about 24 hours or more at 25° C., or even about 48 or more at 25° C. More preferable, the dispersion has a shelf-life of about 3 days or more at 25° C., about 5 days or more at 25° C., or even about 7 days or more at 25° C.

Additional components can be added to the fumed metal oxide dispersion and may be desired depending on the end-use (i.e., type of application) for the dispersion. For example, chelating or complexing agents, dispersing agents, and the like can be used as components in the fumed metal oxide dispersion.

Any suitable chelating or complexing agent can be used in the context of the invention. Suitable chelating or complexing agents can include, for example, carbonyl compounds (e.g., acetylacetonates and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., disodium EDTA), mixtures thereof, and the like), carboxylates containing one or more sulfonic and/or phosphonic groups, and the like. Suitable chelating or complexing agents also can include, for example, di-, tri-, or poly-alcohols (e.g., ethylene glycol, pyrocatechol, pyrogallol, tannic acid, and the like), halides (i.e., fluorides, chlorides, bromides, and iodides), and the like. Similarly, any suitable dispersing agent can be used in the context of the invention. Suitable dispersing agents include, for example, organic acids, tin oxides, and phosphonate compounds.

When the dispersion is applied as a coating onto recording media (e.g., ink jet media), the fumed metal oxide can be treated in such a way so as to increase the quality of the treated recording media. In that respect, the fumed metal oxide can be treated with a molecule such that the molecule changes the surface charge of the fumed metal oxide particles to become cationic. When this dispersion is applied to ink jet media, the paper has a highly absorptive surface, which becomes electostatically interactive with the anionic dyes normally used in ink jet media applications. In essence, such a coating would potentially reduce the smearing and rub off of an image as well as immobilize (i.e., adsorb) ink dyes at the outer surface. This enhances the waterfastness and color density of a printed image.

When the dispersion is used in thermal insulation applications, the fumed metal oxide can be blended with infrared opacifiers, such as, for example, $TiO_2$ (i.e., titania), carbon black, or zirconium silicate. In addition, the fumed metal oxide is often blended with fibers (usually glass, plastic, and/or ceramic fibers) in order to enhance the toughness of the insulation that is ultimately formed. The blend of fumed metal oxide, infrared opacifiers, and, possibly, fibers, then can be compacted to a target density by applying pressure, usually uniaxially. This increase in density is sought in order to improve the mechanical strength of the insulation.

The dispersion also can be used in chemical-mechanical polishing applications. For example, alkali metal ions, halogen-containing compounds, amines, and various other catalysts and/or pH adjusters, as are known in the art, can be added to the dispersion to alter (e.g., increase) the polishing rate of a semiconductor substrate.

In many applications, it is desirable for the fumed metal oxide dispersion to be of high purity. Any suitable technique can be employed for that purpose. One method for increasing purity is to pass the dispersion through a filter (e.g., filtering the dispersion) to remove grit and other impurities and/or to remove particles above a certain size. In order for a dispersion to be filterable, the viscosity of the dispersion must be low enough such that the dispersion is able to pass through the desired filter. The finer the filter (i.e., the smaller the size of the pores of the filter), the lower the viscosity of the dispersion must be for the dispersion to efficiently pass through the filter. As will be appreciated by those of ordinary skill in the art, the dispersion should be passed through as fine a filter as possible to achieve as high a degree of purity as possible. Thus, it is generally advantageous to produce fumed metal oxide dispersions with low viscosities, such as those described herein, such that the dispersion can be filtered with a fine filter if desired.

EXAMPLE

This example further illustrates the invention but, of course, should not be construed as in any way limiting its scope. In particular, this example illustrates the significance of using a metal ion source to prepare a fumed metal oxide dispersion in accordance with the inventive method.

Figure 2:
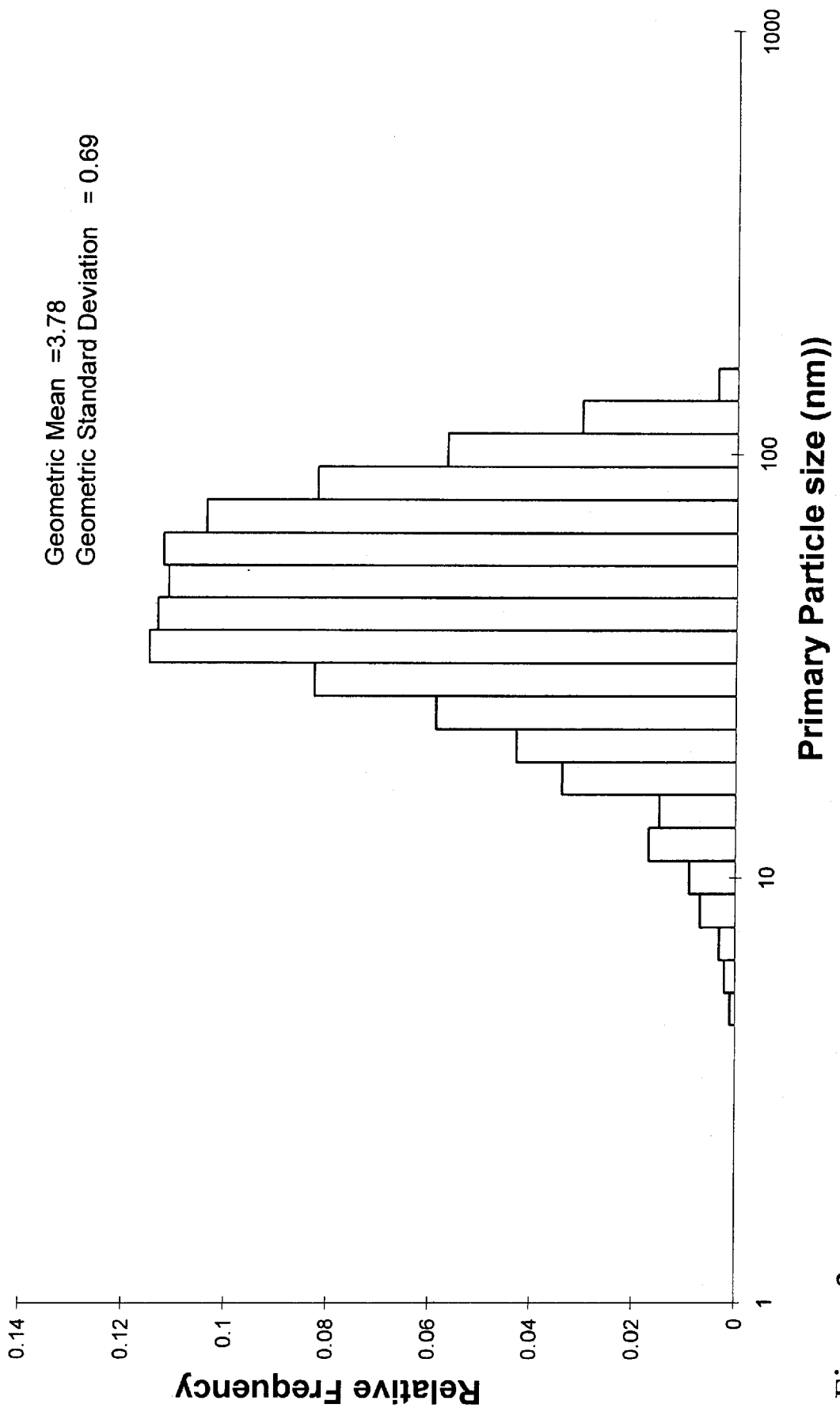
FIG. 2 is a graph depicting the primary particle size of a fumed silica (in log scale) versus the relative frequency of that primary particle size for the fumed silica, demonstrating a relatively narrow primary particle size distribution for the fumed silica.
Figure 3:
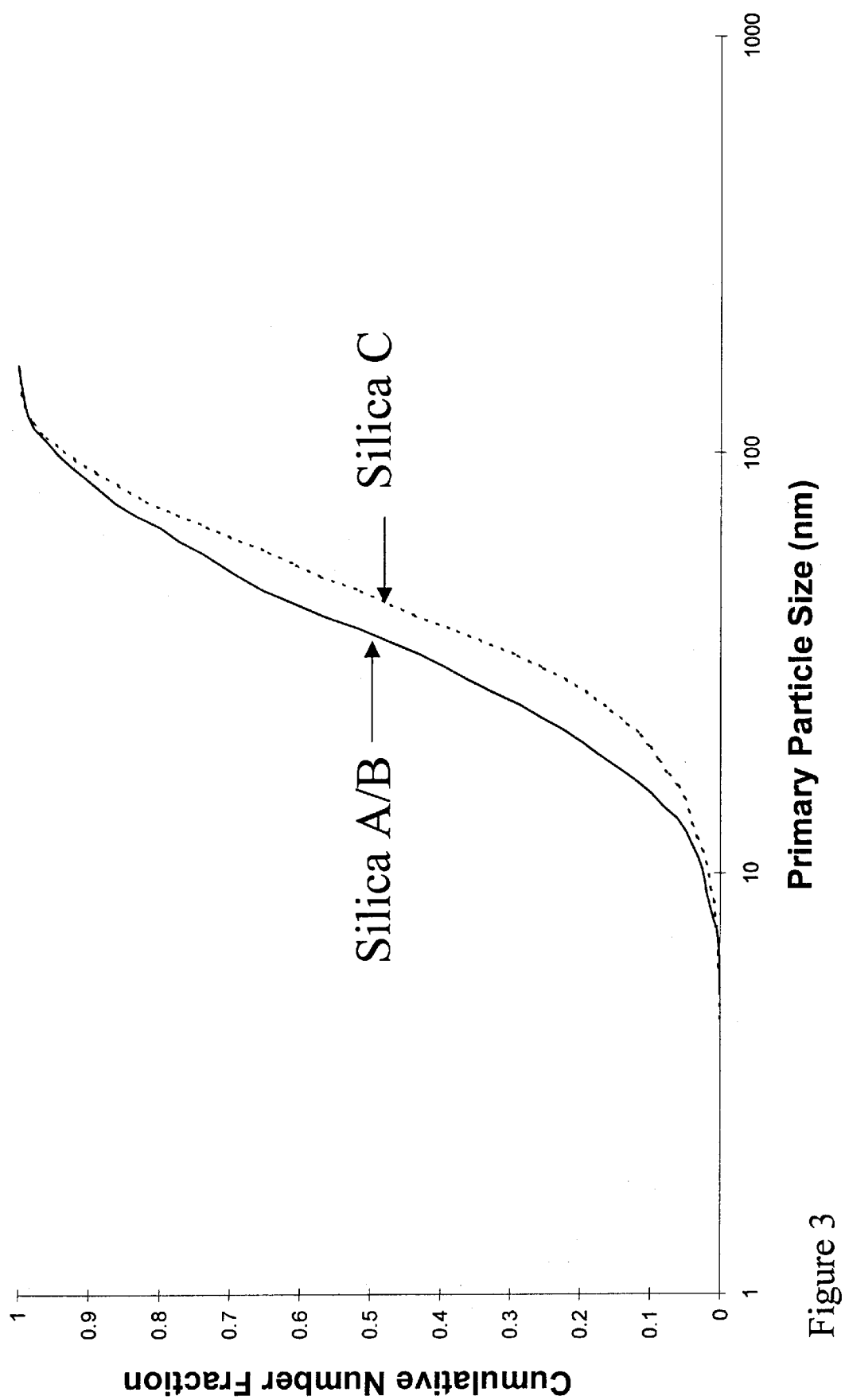
FIG. 3 is a graph depicting the primary particle size of two fumed silicas (in log scale) versus cumulative number fraction, demonstrating how a silica with a relatively broad primary particle size distribution differs from a silica with a relatively narrow primary particle size distribution.

Three different fumed metal oxide particles (designated Fumed Silicas A-C) were used to prepare three different fumed silica dispersions (designated Fumed Silica Dispersions A-C, respectively). Fumed Silicas A and B were identical, while Fumed Silica C differed from Fumed Silicas A and B (referred to as Fumed Silica A/B). The fumed metal oxide particles, specifically, Fumed Silicas A/B and C, were analyzed using a dry powder analysis by transmission electron microscopy (TEM). Measurement of the primary particle size was done by ASTM method D3849. Fumed Silica A/B was found to have a geometric mean particle size distribution of 3.60 nm with a standard deviation of 0.64 nm, while Fumed Silica C was found to have a geometric mean particle size distribution of 3.78 nm with a standard deviation of 0.69 nm. The particle size distributions of Fumed Silicas A/B and C are depicted in the graphs of FIGS. 1 and 2, respectively. In essence, Fumed Silica A/B has a broader (i.e., less narrow) particle size distribution than Fumed Silica C. This is further shown in FIG. 3, in which Silica A/B is seen to have a greater fraction at a smaller primary particle size that Silica C.

Each of Fumed Silicas A-C was used to prepare a 60 wt. % fumed silica dispersion. For each fumed silica dispersion, 20.0 kg deionized water was added to 1.5 kg tetramethylammonium hydroxide (25% aqueous solution) to form the liquid carrier. 31.5 kg fumed silica (i.e., Fumed Silica A, B, or C) then was mixed with the liquid carrier in 400 g aliquots, except that aluminum nitrate (8.5 g $Al(NO_3)_3 \cdot 9H_2O$ in 500 ml deionized water) was added incrementally with Fumed Silica A (but not Fumed Silicas B or C) at a rate corresponding to the rate of the fumed silica addition so as not to form a gel (approximately 5–7 ml/min). Three mixtures were thereby formed. The resulting three mixtures then were subjected to mixing under high shear conditions for approximately 15 minutes. 0.25 kg deionized water then was added to each mixture, along with 1.9 kg of tetramethylammonium hydroxide to adjust the pH to the desired level. Each of these three mixtures again was subjected to mixing under high shear conditions, for an additional 45 minutes.

The dispersion containing Fumed Silica A, along with aluminum nitrate, did not coagulate and was a stable dispersion, despite the relatively broad fumed silica particle size distribution. In direct contrast, a dispersion containing Fumed Silica B could not be formed; rather, the mixture coagulated, thereby indicating that the relatively broad fumed silica particle size distribution prevented formation of a stable dispersion, in the absence of the aluminum nitrate. The dispersion containing Fumed Silica C did not coagulate and was a stable dispersion, although a relatively narrow fumed silica particle size distribution was required.

These results show that a metal ion source can be used in the context of the inventive method to prepare a dispersion of a fumed metal oxide without the need for the fumed metal oxide to have a highly engineered (e.g., relatively narrow) particle size distribution.

All of the references cited herein, including patents, patent applications, and publications, are hereby incorporated in their entireties by reference.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims.

What is claimed is:

1. A method of preparing a dispersion of a fumed metal oxide in a liquid carrier comprising the following sequential steps:
   (a) providing a liquid carrier at a pH that effects dissolution of the metal oxide at a rate the same as or greater than the metal oxide dissolution rate in water at a pH of about 8,
   (b) mixing with the liquid carrier, in any order, one or more aliquots of both a fumed metal oxide and a metal ion source to form a dispersion, such that the dispersion does not coagulate, and
   (c) optionally adjusting the pH of the dispersion to the pH of the liquid carrier in step (a).

2. The method of claim 1, wherein the fumed metal oxide and the metal ion source are individually mixed with the liquid carrier in step (b).

3. The method of claim 1, wherein the fumed metal oxide and the metal ion source are simultaneously mixed with the liquid carrier in step (b).

4. The method of claim 1, wherein the metal ion source is associated with the fumed metal oxide prior to mixing with the liquid carrier in step (b).

5. The method of claim 1, wherein the liquid carrier comprises water and a base, the pH of the liquid carrier in step (a) is about 8 or more, the fumed metal oxide is silica, step (c) is mandatory, and the pH of the dispersion is adjusted in step (c) to a pH of about 9 or more.

6. The method of claim 1, wherein the metal ion of the metal ion source is present in the liquid carrier in an amount of about 0.0001–1 wt. %.

7. The method of claim 6, wherein the metal ion of the metal ion source is present in the liquid carrier in an amount of about 0.005–0.5 wt. %.

8. The method of claim 1, wherein the metal ion of the metal ion source is a monovalent metal ion.

9. The method of claim 8, wherein the metal ion of the metal ion source is a Group I metal ion.

10. The method of claim 1, wherein the dispersion has a shelf-life of at least about 1 hour or more at 25° C.

11. The method of claim 10, wherein the dispersion has a shelf-life of at least about 24 hours or more at 25° C.

12. The method of claim 1, wherein the mixing of the fumed metal oxide, the metal ion source, or both, takes place under high shear conditions in step (b).

13. The method of claim 12, wherein the dispersion of step (b) is subject to additional mixing under high shear conditions.

14. The method of claim 1, wherein the fumed metal oxide has a surface area of about 20–110 $m^2/g$.

15. The method of claim 14, wherein the fumed metal oxide has a surface area of about 25–75 $m^2/g$.

16. The method of claim 15, wherein the fumed metal oxide has a surface area of about 35–45 $m^2/g$.

17. The method of claim 1, wherein the fumed metal oxide is added to the liquid carrier in an amount of about 50 wt. % or more.

18. The method of claim 17, wherein the fumed metal oxide is added to the liquid carrier in an amount of about 60 wt. % or more.

19. The method of claim 18, wherein the fumed metal oxide is added to the liquid carrier in an amount of about 65 wt. % or more.

20. The method of claim 1, wherein the metal ion of the metal ion source is a polyvalent metal ion.

21. The method of claim 20, wherein the metal ion of the metal ion source is a Group II, Group III, or transition metal ion.

22. The method of claim 21, wherein the metal ion of the metal ion source is a Group III metal ion.

23. The method of claim 22, wherein the Group III metal ion is aluminum.

24. The method of claim 1, wherein step (c) is mandatory.

25. The method of claim 24, wherein the pH of the dispersion is adjusted in step (c) to a pH of about 9 or more.

26. The method of claim 25, wherein the pH of the dispersion is adjusted in step (c) to a pH of about 10 or more.

27. The method of claim 26, wherein the pH of the dispersion is adjusted in step (c) to a pH of about 11 or more.

28. The method of claim 1, wherein the liquid carrier comprises water and a base.

29. The method of claim 2, wherein the fumed metal oxide is selected from the group consisting of alumina, silica, titania, ceria, zirconia, germania, magnesia, and mixtures thereof.

30. The method of claim 29, wherein the fumed metal oxide is silica.

31. The method of claim 28, wherein the base is selected from the group consisting of alkalis, amines, and quaternary ammonium salts.

32. The method of claim 31, wherein the base is selected from the group consisting of sodium hydroxide, potassium hydroxide, lithium hydroxide, ammonium hydroxide, ammonia, triethylamine, dimethylethanol amine, tetramethylammonium hydroxide, and mixtures thereof.

33. The method of claim 32, wherein the base is tetramethylammonium hydroxide.

34. The method of claim 28, wherein the pH of the liquid carrier in step (a) is about 8 or more.

35. The method of claim 34, wherein the pH of the liquid carrier in step (a) is about 9.5–12.

36. The method of claim 35, wherein the pH of the liquid carrier in step (a) is about 10–11.

37. The method of claim 28, wherein the metal ion source is in the form of a salt.

38. The method of claim 37, wherein the metal ion source is a sulfate, nitrate, chloride, acetate, or mixtures thereof.

39. The method of claim 38, wherein the metal ion source is aluminum nitrate.

40. The method of claim 28, wherein the dispersion has a pH of about 9 or more.

41. The method of claim 40, wherein the dispersion has a pH of about 10 or more.

42. The method of claim 41, wherein the dispersion has a pH of about 11 or more.

* * * * *